Patented July 7, 1936

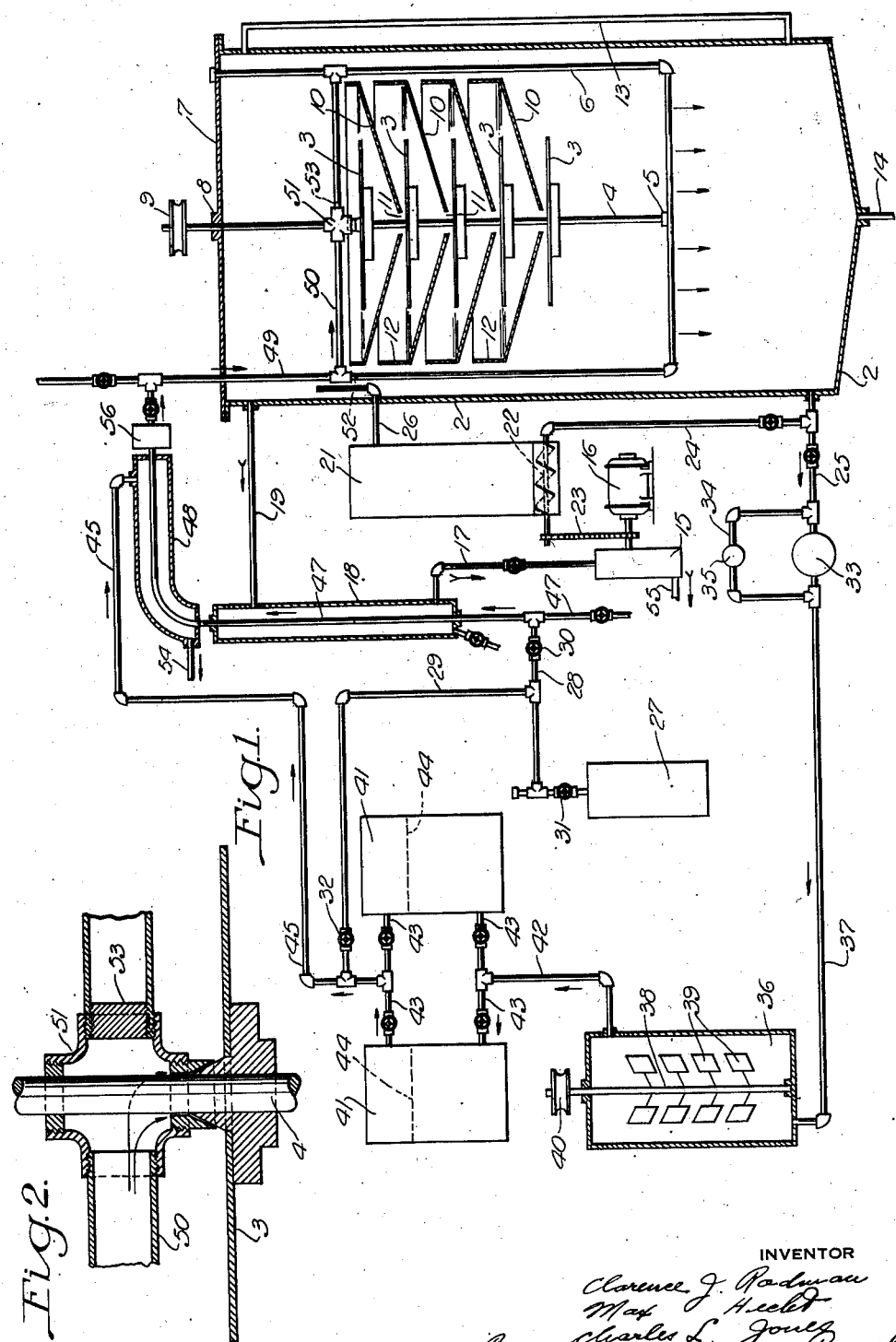

2,047,157

UNITED STATES PATENT OFFICE 2,047,157

PROCESS FOR PURIFYING OILS

Clarence J. Rodman, Alliance, Ohio, and Max Hecht and Charles L. Jones, Pittsburgh, Pa.; said Jones and said Hecht assignors to said Rodman Application August 14, 1928, Serial No. 299,530

5 Claims. (Cl. 196—16)

This invention relates to a method and apparatus for purifying liquids, and more particularly to a method for rendering non-aqueous liquids such as mineral hydrocarbon oils anhydrous, free from dissolved gases, volatiles and volatile hydrocarbons which result from oxidation.

It also relates to the breaking up of emulsions and to the removal of true water of solution.

Our method includes introducing the liquid in a filmed state into a rarefied atmosphere and immediately dispersing the liquid while preventing the formation of foam or froth, the whole operation being carried out in a manner such that the liquid is prevented from contacting with atmospheric moisture and gases until the process is complete.

Our invention comprises an improved method for treating liquids while subjecting them to a constantly maintained high vacuum wherein the liquid is filmed or finely subdivided in such a manner that the maximum water vapor and gases are freed from the liquid, and wherein the true water solution is removed from the liquid.

Although in this specification only the purification of mineral hydrocarbon oils is described in detail, it is to be understood that the process and apparatus embodying our invention is applicable to the purification of any non-aqueous liquid. In the purification of mineral hydrocarbon oils our invention is applicable both to the preparation of new oils, and to the conditioning of oils after use, for example, in oil submerged electrical apparatus.

Mineral hydrocarbon oils are refined for and find a wide application as an insulating medium in oil submerged electrical apparatus because of the dielectric strength characteristics of the oil. The oils are used both as a cooling and insulating medium in transformers, voltage regulators and as an insulating medium in cable joints and the like. When hydrocarbon oils are used for these purposes, they are subjected to oxidation reactions resulting from the combined action of heat absorbed from the electrical apparatus, and the oxygen in the atmosphere which has ready access to the oil. Complex hydrocarbons are chemically altered by such oxidation reactions resulting in the formation of organic acids, volatile hydrocarbons, soap and deposits termed sludge. When hydrocarbon mineral oils are used in electrical apparatus such as circuit breakers, the arcing action which takes place results in decomposition of the complex hydrocarbons forming elemental carbon, hydrogen, carbon monoxide, carbon dioxide, methane, and hydrocarbon vapors, all of which reduce the dielectric strength of the insulating medium. Concurrently with the decomposition of a portion of the oil, water may be formed due to the combination of hydrogen evolved in the zone of the arc with oxygen dissolved in the oil. These traces of water may be in true solution in the oil and together with the evolved carbon particles of colloidal size contribute to the deterioration of the insulating value of the oil.

Oil used in operating circuit breakers is generally at the same temperature as the temperature surrounding the circuit breaker. Oil used in operating transformers or regulators generally attains a temperature not exceeding 95 degrees centigrade, or approximately 203 degrees Fahrenheit. The standard rules concerning temperature of transformer oil state that the maximum temperature to which such oil may be safely subjected is 55 degrees centigrade or 131 degrees Fahrenheit above the ambient temperature of 40 degrees centigrade, corresponding to 104 degrees Fahrenheit. The temperature of oil used for various electrical insulation purposes will range from atmospheric temperature to the maximum of 203 degrees Fahrenheit or 95 degrees centigrade. In the majority of cases oil, to be reconditioned, will be closer to atmosphere temperature.

In accordance with our invention we introduce a liquid in a finely divided condition, or in a filmed state into a rarefied atmosphere and disperse the liquid without the formation of a foam or froth in such a manner that the maximum content of water vapor and gases are released from the liquid. In accomplishing the dispersion of the liquid any desired or suitable apparatus may be employed, but we prefer to accomplish the dispersion by applying the liquid to rotating discs arranged in a vacuum tank. By this means the liquid is subjected to a vacuum immediately upon being dispersed, which prevents the formation of a froth or foam.

The liquid is applied to the disc near its center while the disc is rotated at a high speed. We prefer to arrange the axis of the disc in a vertical position but if desired the axis may be inclined at any degree to the vertical or it may be arranged in a horizontal position. The liquid applied to the disc forms a film thereon, the thickness of the film varying inversely as the distance from the center of the disc increases. The thickness of the film so formed is substantially less than one millimeter. Any single particle of the liquid in the film is caused to travel to the edge of the disc in a spiral path due to the rotational velocity imparted to the particle and because of the wetting of the disc surface by the particle surface of the liquid. There is induced onto each particle of the film a rotational, spinning or whirling action on the axis of each particle.

As each particle leaves the disc center and approaches the edge of the disc the individual particles decrease in size due to the various forces acting on it, which forces include surface tension of the liquid, centrifugal force, contour of the disc, and the composition of the metal from which the disc is made.

The liquid is projected from the rotating disc at high velocity in dispersed form. The speed of the dispersion may be increased by using a disc having a roughened or matte finish or, if desired, the disc surface may be grooved. The surface of the disc may be truly plane or it may be concave upwards. We prefer, however, to use a plane disc made of brass and having a polished surface.

The tank in which the rotating discs are arranged is maintained at sub-atmospheric pressure throughout the entire process and it is preferred to maintain a pressure of not over about 2 pounds per square inch absolute pressure within the vacuum tank. By employing such a vacuum, moisture and gas contained in the dispersed particles are eliminated immediately upon dispersion so that when the particles contact with each other they do not foam or form a froth.

From the foregoing it will be seen that the oil is introduced into the chamber under a very high vacuum, where it is poured onto the central portion of the rapidly rotating discs which causes immediately the dispersion of the oil in such a manner that any water previously dissolved in the oil is immediately flashed from the oil because of the evaporation of the water at the reduced boiling point and because a spaced relationship is set up on the highly revolving discs between any two particles of oil. In other words, the globules of oil in finely divided or filmed condition are thrown with considerable violence outwardly and during their travel spirally outward across the faces of the discs, are subjected to the high vacuum so that any moisture or entrained volatile gases will be brought to the surface of the globular oil films and will be flashed into vapor. These globules, upon being thrown from the rotating discs will impact with considerable violence against the stationary baffles which will cause the globules to smash and thereby release any further entrained moisture or undesirable gases. By arranging the rotating discs and intermediate baffles in succession in the manner illustrated this treatment of the highly atomized and finely dispersed liquid is prolonged so that by the time the oil reaches the end of its travel in the vacuum chamber, all of the moisture and undesirable gases will have been removed from the oil. This moisture, vapors and volatilized gases will be immediately and constantly removed by the vacuum pump, the vapors and gases flowing out through the pipes 19, 18 and 17.

In the vacuum chamber the area of the oil exposed to the high vacuum is enormously increased by the centrifugal dispersion and impact with the result that the dissolved water and gases are instantly and completely liberated from the mist-like oil and are evacuated immediately to the atmosphere.

We prefer to introduce a small volume of an inert gas such as carbon dioxide, nitrogen or other similar gas into the liquid stream before introducing the liquid into the vacuum chamber. Such gases assist materially in effecting a more thorough drying of the liquid. In place of using inert gases such as mentioned, we may, if desired, employ more or less highly volatile dielectrics which accomplish similar results. This diffusion of an inert gas or a dielectric in the liquid has a clean-up or sweeping-out effect on the water vapor and volatiles released in the vacuum chamber.

In the drawing which illustrates the present preferred embodiment of an apparatus used in carrying out our method for the purification of non-aqueous liquids, Figure 1 is a schematic view of the entire apparatus, and Figure 2 is a detail view of the nozzle used for applying the liquid to the rotating discs which are arranged within the vacuum tank.

Referring to the preferred embodiment of the apparatus illustrated in the drawing, there is shown a cylindrical tank 2 having a plurality of discs 3 rotatably mounted therein. The discs are arranged on a vertical shaft 4 mounted at its lower end in a roller bearing 5. This bearing is supported by a stirrup or frame 6 which, as shown, is made out of hollow pipe. The hollow pipe forming the frame is connected to the cover 7 of the tank. The upper end of the shaft 4 is mounted in a bearing 8 and the shaft is rotated through a pulley 9 from any desired source.

A series of baffles 10 having openings 11 arranged adjacent their centers and having vertical portions 12 are arranged within the tank in order to receive the liquid projected from one of the discs 3 and to direct it onto the next lower disc from which it is again projected. A gauge glass 13 is provided in order to indicate the level of the liquid in the tank and a drain pipe 14 is arranged near the bottom of the tank in order to clean out the tank when desired.

The vacuum is maintained within the tank 2 by means of a vacuum pump 15 driven by a motor 16. The vacuum pump is connected through conduit 17, heat exchanger 18 and conduit 19 to the vacuum tank.

After the oil which has been dispersed and subjected to the vacuum in the vacuum tank leaves the tank it is treated with an evacuated anhydrous gas-free adsorbent material in order to free it from impurities such as unsaturates, resinous compounds, acidic compounds and oxidation products. For this purpose a container 21 from which the adsorbent material is supplied is arranged adjacent the vacuum tank. A screw conveyor 22 is arranged near the lower end of the container 21 and this conveyor is driven by the motor 16 through a driving chain 23. The evacuated adsorbent material is forced by the screw conveyor 22 through a conduit 24 and is thereby mixed with the liquid flowing out from the vacuum tank through the pipe 25. The evacuated adsorbent material contained in the container 21 is maintained free from moisture and gas and in an evacuated condition by means of a pipe 26 connecting the upper end of the container 21 with the vacuum tank 2.

An inert gas which aids in drying the dispersed liquid is supplied from a container 27, and is introduced into the liquid which is to be purified through pipes 28, and valves 30 and 31. An inert gas may be supplied to the liquid after leaving the vacuum tank through pipe 29, through valves 32 and 31, when it is desired to prevent access of air to the finished product.

The liquid flowing out of the vacuum tank 2 through pipe 25 is pumped by a pump 33 which may be provided with a by-pass 34 and a gauge 35, into an agitating tank 36 through a pipe 37. The agitating tank has a shaft 38 provided with paddles 39 arranged therein in such a manner as to exclude air and moisture from the agitating tank. The shaft 38 is driven through a pulley 40 from any desired source of power.

A plurality of filters 41 are connected to the agitating tank 36 by a pipe 42 and branch pipes 43 so that one of the filters 41 may be used while the other filter is being cleaned. The filters may be of any desired type but as shown they are provided with porous diaphragms 44 through which the fluid flows upwardly and exits through the conduit 45.

In carrying out the process, the liquid to be purified is introduced into the pipe 47, flows through heat exchangers 18 and 48 which surround the pipe 47, heater 56, and is introduced into the vacuum tank through pipes 49 and 50 and the nozzle 51. Plugs are inserted in the pipes which formed the frame for supporting the discs 3 at the points indicated at 52 and 53 in order to cause the liquid introduced into the vacuum tank to flow as indicated.

The liquid flows from the nozzle 51 onto the center of the top disc 3 and due to the rapid rotation of the disc is projected outwardly therefrom and contacts with the baffle 10. During projection of the dispersed liquid outwardly from the disc 3 the particles are subjected to the action of the reduced pressure which causes the removal of moisture and gases from the particles. The particles are collected by the baffles 10 and distributed through openings 11 onto the next lower disc. From the lowest disc on the shaft 4 the liquid is projected against the sides of the vacuum tank and flows to the bottom of the tank as indicated by the arrows.

The fluid from which the moisture and gases have been removed flows through pipe 25, pump 33, pipe 37, into the agitating chamber 36 where the liquid and evacuated adsorbent material which was introduced into the liquid from the container 21 by means of conveyor 22 and pipe 24 are agitated.

The liquid containing the evacuated adsorbent material flows into the filters 41 which filter the adsorbent material and suspended products which may have been in the liquid from the liquid and the liquid flows through pipe 45 into heat exchanger 48 and is delivered through pipe 54 to storage tanks.

After leaving the filters 41 inert gas is supplied to the liquid from container 27 through pipe 29. Other inert gas is introduced into the liquid through the pipe 28 as the liquid flows through the pipe 47.

The gases and moisture which are separated from the dispersed particles of liquid in the vacuum tank are removed from the tank through conduit 19, heat exchanger 18, pipe 17, vacuum pump 15 and delivery pipe 55.

From the above description it will be apparent that our process provides a means for purifying non-aqueous liquids in which the entire process is carried out without the liquid coming in contact either with moisture or atmospheric gases, and that by our process after the moisture and gases have been removed from the liquid by a vacuum an inert gas is added to the purified liquid, thereby raising the pressure of the rarefied gas to approximately atmospheric pressure so that there will be little tendency for the purified gas to absorb moisture or gases from the atmosphere.

Our complete process is carried out in the manner above described but it will be understood that if desired the process may be conducted by simply passing the oil through the vacuum chamber in the manner described in order to remove moisture and gases, without subjecting the oil to further purification such as by adding on evacuated adsorbent material to the oil. The addition of an inert gas either to the liquid to be purified or to the liquid after purification is also optional.

If it is not desired to heat the liquid before dispersing it in the vacuum tank, the liquid may be introduced into the tank through pipe 57 without passing through the heater 56.

Although we have described in detail our preferred method and have described and illustrated a preferred form of apparatus for carrying out our invention, it is to be understood that the invention may be otherwise embodied without departing from the spirit of the invention or the scope of the following claims.

We claim:

1. The process of removing moisture and gases from non-aqueous liquids which comprises introducing an inert gas into the liquid, spraying the liquid and contained gas in finely dispersed form in a vacuum to separate moisture and gases therefrom, introducing an anhydrous, gas-free adsorbent material into the liquid, filtering and adding inert gas to the filtered liquid, the process being effected out of contact with water and atmospheric gases.

2. The process of removing moisture and gases from oil, comprising introducing an inert gas into the oil, dispersing the oil into particles in a rarefied atmosphere by projecting it into space at high velocity from a rapidly rotating disc to separate moisture and gases from the oil, introducing an anhydrous gas-free adsorbent material into the oil, filtering and adding inert gas to the filtered oil, the process being effected out of contact with water and atmospheric gases.

3. The method of removing moisture and gases from non-aqueous liquids which comprises introducing an anhydrous chemically and physically inert gas into the liquid and converting the liquid containing inert gas into a finely divided liquid form in a closed system while excluding air and extraneous moisture and while maintaining the system under a high vacuum adapted to cause rapid evaporation of gases and moisture from the liquid thereby causing rapid liberation of moisture and gases from the liquid, continuously removing from the system the liberated gases and moisture, and recovering substantially anhydrous and gas-free liquid.

4. The process of rendering non-aqueous liquids anhydrous and gas-free which comprises feeding the liquid onto a rapidly rotating member in a closed system to cause the liquid to be impelled centrifugally in film-like form of substantially 1 millimeter thickness while continuously maintaining in the system a vacuum adapted to cause substantially instantaneous evaporation of moisture and gases from the liquid and while excluding air and extraneous moisture from the system, continuously removing from the system moisture and gases liberated from the liquid, and recovering substantially anhydrous and gas-free liquid.

5. The process of rendering non-aqueous liquids anhydrous and gas-free which comprises feeding the liquid onto a rapidly rotating member in a closed system to cause the liquid to be impelled centrifugally into film-like form of substantially not more than 1 millimeter thickness while maintaining in the system a vacuum as high as 28 to 30 inches of mercury while excluding air and extraneous moisture from the system, continuously removing from the system moisture and gases evaporated from the liquid, and recovering substantially anhydrous and gas-free liquids.

CLARENCE J. RODMAN.
MAX HECHT.
CHARLES L. JONES.